Patented Dec. 13, 1927.

1,652,931

UNITED STATES PATENT OFFICE.

LEO M. DE MARS, OF MINNEAPOLIS, MINNESOTA.

CLEANING AND POLISHING COMPOUND.

No Drawing.  Application filed May 11, 1925. Serial No. 29,573.

The main object of my invention is to provide a form of cleaning and polishing compound that will clean the surface of nickel, silver, German silver, brass, bronze, aluminum, copper, etc., without scratching the most highly polished surface or without having any harmful effect on the materials.

Another object is to provide in a compound of the class described, means for softening, dissolving and loosening the film that gathers on polished surfaces from various oxidizing actions and the like.

Another object is to provide with a solvent, a means that will polish the surface when the clouded effect has been dissolved or removed by the solvent portion of the compound.

Another object is to provide in a compound, improved form of polishing means with an improved solvent that will not affect the polishing means or cause it to deteriorate.

There has been many forms of cleaning and polishing compounds devised and used and for some classes of work numerous compounds work satisfactorily, but to the best of my knowledge there has never before been produced a compound that will clean and polish highly polished surfaces without causing either an acid action on the surface, which will more or less mar the surface as shown under microscopic examination, or will scratch the surface with fine lines that will show under microscopic examination and will destroy the usefulness of some objects, although on certain classes of work such scratches might not be detrimental.

In certain classes of photographic work, for instance the polishing of films or photographic postal cards where high polish is required, it is customary to use a nickel plated cylinder which is heated generally around 120 degrees and against the face of which the photographic units are pressed and carried therearound by a belt.

The action of the photographic chemicals on the nickel plated surface soon mar the surface and it has been found impossible to repolish this surface in the past, with the result that it has been necessary to replate these cylinders at such frequent intervals as to bring the cost of such work up to a high figure.

I devised my formula primarily for use on such cylinders, as microscopic scratches which might be unnoticed on a great many classes of work, destroy the usefulness of the cylinder in this polishing process and my compound is such that the surfaces of these cylinders can be cleaned and polished leaving no microscopic scratches whatsoever and saving the recurrent expense of plating these cylinders.

My improved compound consists of a mixture of Vienna lime and carbon tetra-chloride. While I may vary the proportions, in general I prefer to use four pounds of the lime to one gallon of carbon tetra-chloride, as I have found this proportion to be the best for general purposes.

The term Vienna lime, as herein employed, is used to designate a domestic product comprising the following elements in the proportions noted: calcium 52.33 parts, magnesia 44.64 parts, iron and aluminum oxides 1.96 parts, silica .60 parts, and insoluble acids .23 parts.

I have found that part lime will polish the surface when applied thereto in solution, or if applied very scantily in powdered form, but practically any substance in which the lime may be held in suspension, will slake it more or less rapidly, so that compounds put up in water or with benzine, or any other substance except carbon tetra-chloride, will slake the lime and cause it to lose its activity and hence defeat the object for which it is used. On the other hand, I have found that the lime will not mix with the carbon tetra-chloride and remain with it indefinitely without slaking and inasmuch as carbon tetra-chloride is probably the best solvent for removing oxidized surfaces from polished metal regardless of the contributing causes to the oxidization with plain moisture, sulphur or otherwise, its solvent properties together with its property mixing with the lime without slaking it, makes it an ideal constituent of a polishing compound.

My compound is used very simply by moistening a small piece of cloth, rubbing this on the parts to be cleaned as if washing, then wiping off while still wet and then polishing with a flannel cloth.

The moistened cloth wets the parts to be cleaned sufficiently to allow the carbon tetra-chloride and lime to get into and dissolve and wash off the accumulated grime, oxidization etc., and when the compound has been wiped off while still wet, there is yet a sufficient amount of lime still unslaked left on the surface to give it a fine polish when rubbed with a flannel cloth.

I claim:

A cleaning and polishing compound consisting of approximately one gallon of carbon tetra-chloride and approximately four pounds of Vienna lime.

LEO M. DE MARS.